(12) United States Patent
Wang

(10) Patent No.: US 7,694,935 B2
(45) Date of Patent: Apr. 13, 2010

(54) AUTOMATICALLY SHUT OFF WATER FAUCET

(76) Inventor: Yen Ching Wang, No. 675, Sec. 1, Luho Road, Lugang Town, Changhua Hsien 50545 (TW)

( * ) Notice: Subject to any disclaimer, the term of this patent is extended or adjusted under 35 U.S.C. 154(b) by 409 days.

(21) Appl. No.: 11/906,291

(22) Filed: Oct. 1, 2007

(65) Prior Publication Data
US 2009/0084999 A1 Apr. 2, 2009

(51) Int. Cl.
*F16K 31/12* (2006.01)
(52) U.S. Cl. ............................. 251/54; 251/12; 251/48; 251/318
(58) Field of Classification Search .................... 251/12, 251/48, 50, 54, 318, 319, 320
See application file for complete search history.

(56) References Cited

U.S. PATENT DOCUMENTS 1,555,755 A * 9/1925 Pratt ........................... 251/44
1,950,749 A * 3/1934 Ross ........................... 251/50
2,324,946 A * 7/1943 Molloy ........................ 251/50
2,665,106 A * 1/1954 Ross ........................... 251/50
4,268,008 A 5/1981 Barnum et al. ................ 251/44
4,335,852 A 6/1982 Chow .......................... 239/68
4,653,534 A 3/1987 Chung-Shan .......... 137/624.12

\* cited by examiner

*Primary Examiner*—John K Fristoe, Jr.
(74) *Attorney, Agent, or Firm*—Charles E. Baxley

(57) ABSTRACT

A water faucet includes a receptacle engaged into a housing and having a passage communicating with a water outlet of the housing, a valve stem slidably engaged through the passage of the receptacle and having a valve member for controlling the water to flow from the water inlet to the water outlet of the housing, and a piston attached to the valve stem and slidably engaged in a compartment of the receptacle, the valve stem includes one or more orifices and one or more apertures for controlling a fluid to flow between the compartment of the receptacle and a cavity of the valve stem, and a valve element may adjust the flowing of the fluid into and out of the cavity of the valve stem.

12 Claims, 6 Drawing Sheets

AUTOMATICALLY SHUT OFF WATER FAUCET

BACKGROUND OF THE INVENTION

1. Field of the Invention

The present invention relates to a water faucet, and more particularly to an automatically shut off water faucet including a simplified structure for controlling the flowing quantity or the flowing time of the outlet flowing water.

2. Description of the Prior Art

Typical water faucets comprise a water passage formed or provided in a faucet body, a water inlet coupled to a water reservoir, a water outlet for discharging the water, and a control valve engaged into the water passage for controlling the flowing of the water through the water passage and out of the water outlet.

For example, U.S. Pat. No. 4,268,008 to Barnum et al. discloses one of the typical push button faucets comprising an energy saving effect for delivering a predetermined volume of water in a set period of time.

However, a large number of parts or elements are required to be engaged into the typical push button faucet body such that the typical push button faucet body is required to be formed with a great volume.

U.S. Pat. No. 4,335,852 to Chow discloses another typical device for controlling the flow of fluid with a cam and ratchet wheel and also for delivering a predetermined volume of water in a set period of time.

However, similarly a large number of parts or elements are required to be engaged into the housing of the typical water control device such that the housing of the typical water control device is also required to be formed with a great volume.

U.S. Pat. No. 4,653,534 to Chung-Shan discloses a further typical water faucet with a timing device for controlling the flow of fluid and also for delivering a predetermined volume of water in a set period of time.

However, similarly a large number of parts or elements are required to be engaged into the housing of the typical water faucet such that the housing of the typical water faucet is also required to be formed with a great volume.

The present invention has arisen to mitigate and/or obviate the afore-described disadvantages of the conventional automatically shut off water faucets.

SUMMARY OF THE INVENTION

The primary objective of the present invention is to provide an automatically shut off water faucet including a simplified structure for controlling the flowing quantity or the flowing time of the outlet flowing water through the water faucet.

In accordance with one aspect of the invention, there is provided a water faucet comprising a housing including a chamber formed therein, and including a water inlet communicating with the chamber of the housing for receiving a water, and including a water outlet for discharging the water, a receptacle engaged into the chamber of the housing and including a compartment formed in an upper portion, and a passage formed in a lower portion and communicating with the compartment and the water inlet of the housing, and including at least one conduit formed in the receptacle and communicating with the passage for communicating the passage with the water outlet of the housing, and including a valve seat, a valve stem slidably engaged through the compartment and the passage of the receptacle and sealingly engaged with the receptacle for separating the compartment and the passage of the receptacle from each other and for preventing the water from flowing from the passage into the compartment of the receptacle, the valve stem including a valve member for selectively and sealingly engaging with the valve seat of the receptacle and for selectively blocking the passage of the receptacle and for preventing the water from flowing from the water inlet of the housing into the passage and the conduit of the receptacle and into the water outlet of the housing, and the valve stem including a cavity formed therein, a spring biasing device for biasing the valve member of the valve stem to engage with the valve seat of the receptacle, and a piston attached to the valve stem and slidably engaged in the compartment of the receptacle and sealingly engaged with the receptacle for separating the compartment of the receptacle into a lower space and an upper space, and the valve stem includes at least one orifice for communicating the cavity of the valve stem with the lower space of the receptacle, and includes at least one aperture for communicating the cavity of the valve stem with the upper space of the receptacle and for allowing a fluid received in the compartment of the receptacle to flow between the lower space and the upper space of the receptacle and to flow into and out of the cavity of the valve stem through the orifice and the aperture of the valve stem, the water is allowed to flow from the water inlet of the housing into the passage and the conduit of the receptacle and into the water outlet of the housing when the valve member of the valve stem is disengaged from the valve seat of the receptacle, and when the valve stem is moved against the biasing device.

The housing includes a partition provided in the chamber of the housing for forming a space, and for separating the water inlet of the housing from the space and the water outlet of the housing.

The housing includes an inner peripheral recess formed therein and communicating with the space and the water outlet of the housing, and aligned with the conduit of the receptacle for allowing the water to flow from the passage of the receptacle through the conduit of the receptacle and into the inner peripheral recess and the space and the water outlet of the housing.

The valve stem includes a diameter reduced neck portion provided therein and arranged for allowing the water to selectively flow from the passage into the conduit of the receptacle.

A cap may further be provided and engaged onto the receptacle for closing the compartment of the receptacle, and the valve stem is slidably engaged through the cap.

A button may further be provided and attached to the valve stem and moved in concert with the valve stem, and the biasing device includes a spring member engaged between the button and the receptacle for biasing the button and the valve stem to move relative to the housing and for actuating the valve member of the valve stem to engage with the valve seat of the receptacle.

A cover may further be provided and attached onto the housing and engaged with the receptacle for retaining the receptacle in the chamber 11 of the housing, and includes a barrel extended upwardly from the cover, and includes a pathway formed therein for slidably receiving the button and for allowing the button to be slidably extended out of the barrel of the cover. A knob may further be provided and secured to the button with at least one fastener.

A valve element may further be provided and movably engaged into the cavity of the valve stem and includes a rod extended into the cavity of the valve stem for determining a flowing of the fluid between the lower space and the upper space of the receptacle.

The valve element is engaged with the valve stem with a threading engagement for allowing the rod of the valve element to be moved and adjusted relative to the orifice and the aperture of the valve stem and for adjusting the flowing of the fluid between the lower space and the upper space of the receptacle.

The valve element includes an engaging slot formed therein for engaging with a driving tool device and for adjusting the valve element relative to the valve stem and for adjusting the rod of the valve element relative to the orifice and the aperture of the valve stem.

A sealing ring may further be provided and attached to the valve stem and sealingly engaged with the receptacle for separating the compartment and the passage of the receptacle from each other.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
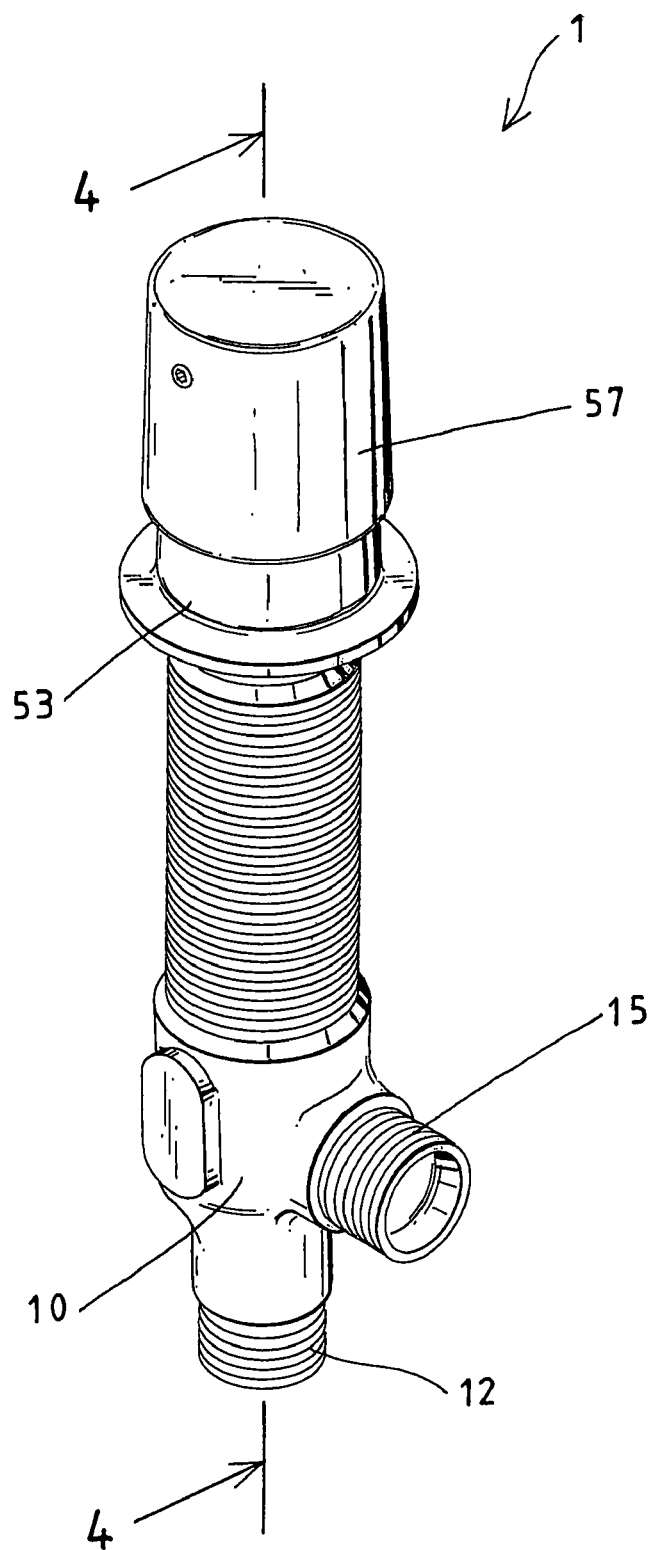
FIG. 1 is a perspective view of an automatically shut off water faucet in accordance with the present invention.
Figure 2:
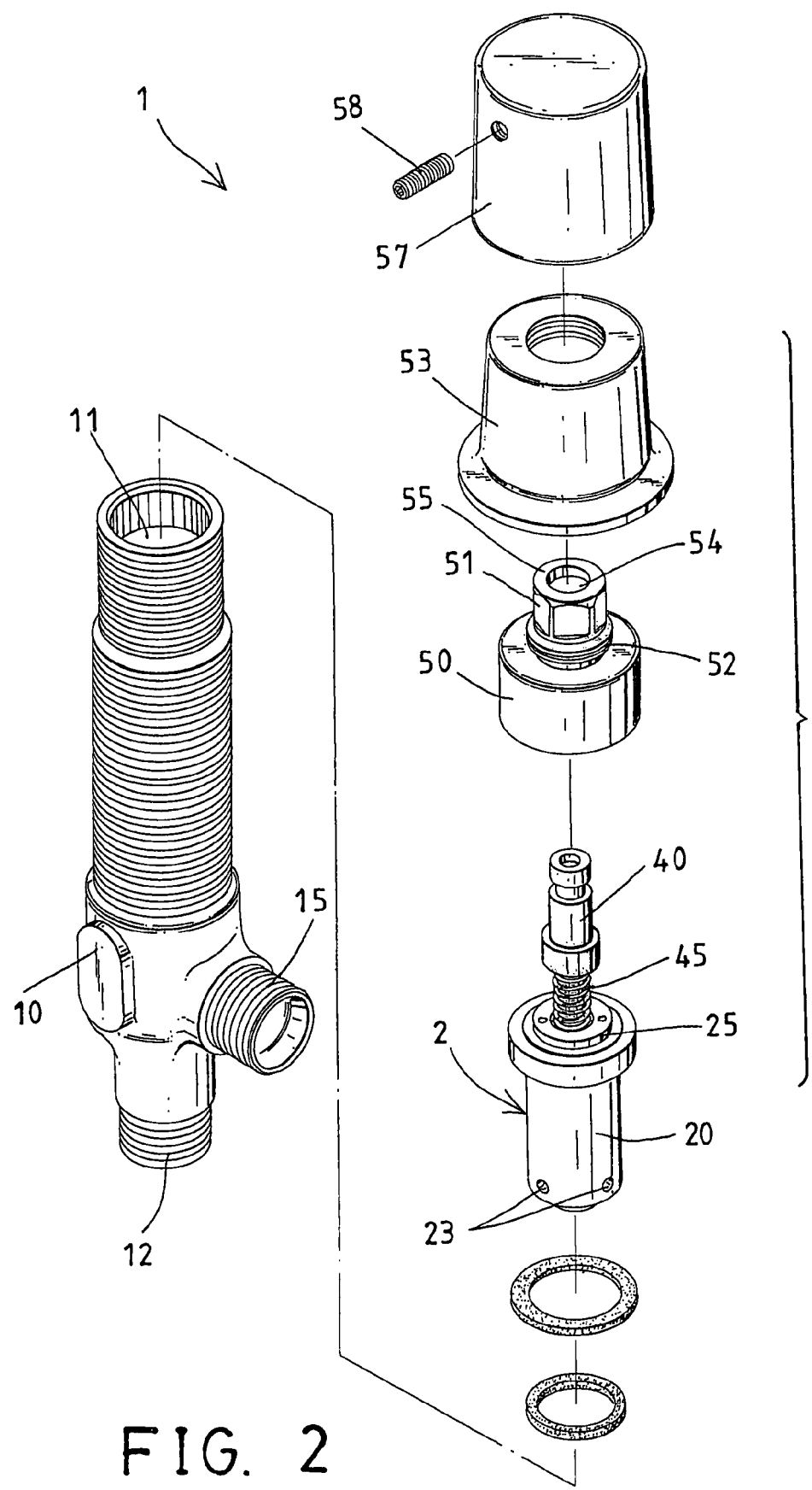
FIG. 2 is a partial exploded view of the water faucet.
Figure 3:
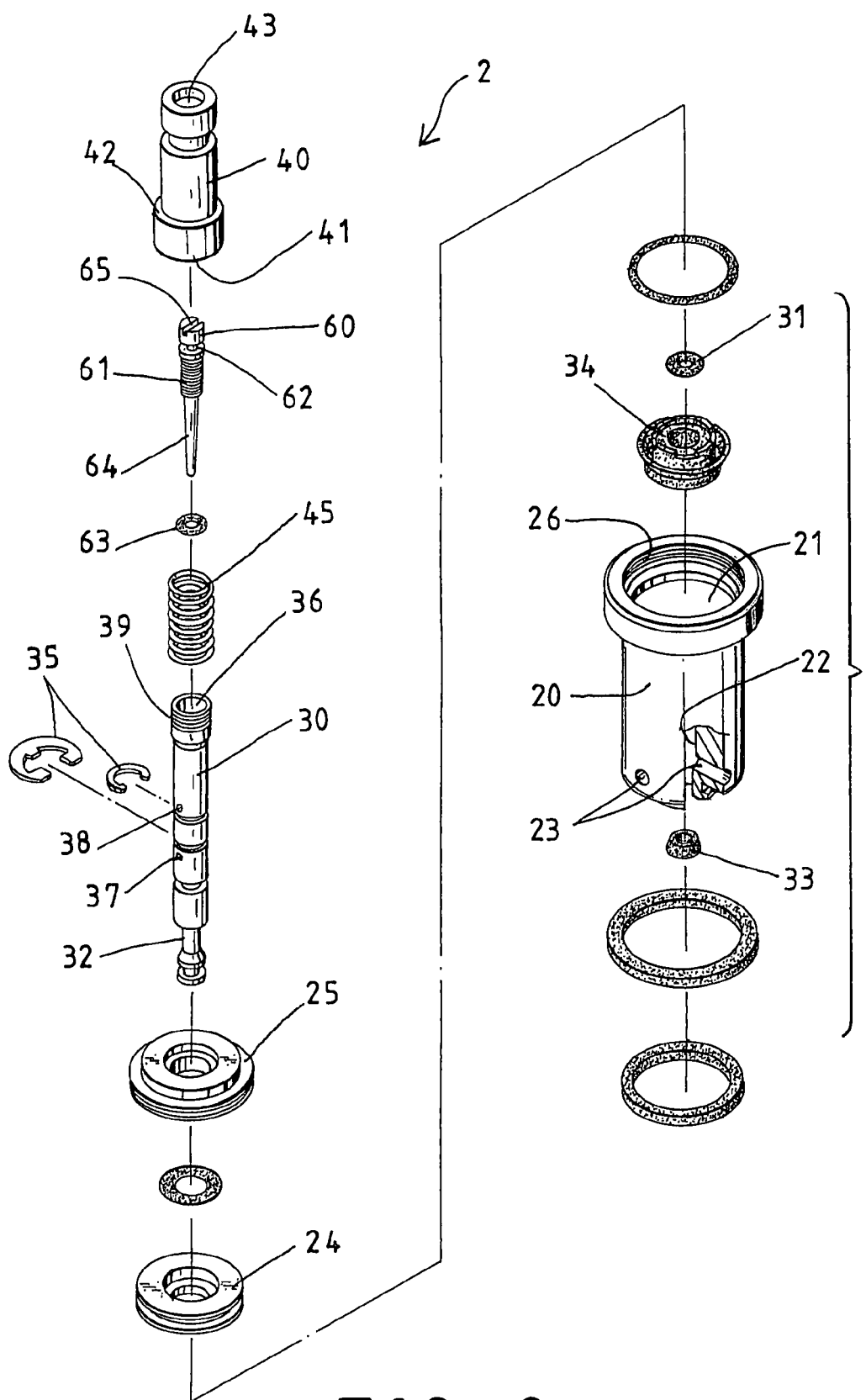
FIG. 3 is another partial exploded view of the water faucet.
Figure 4:
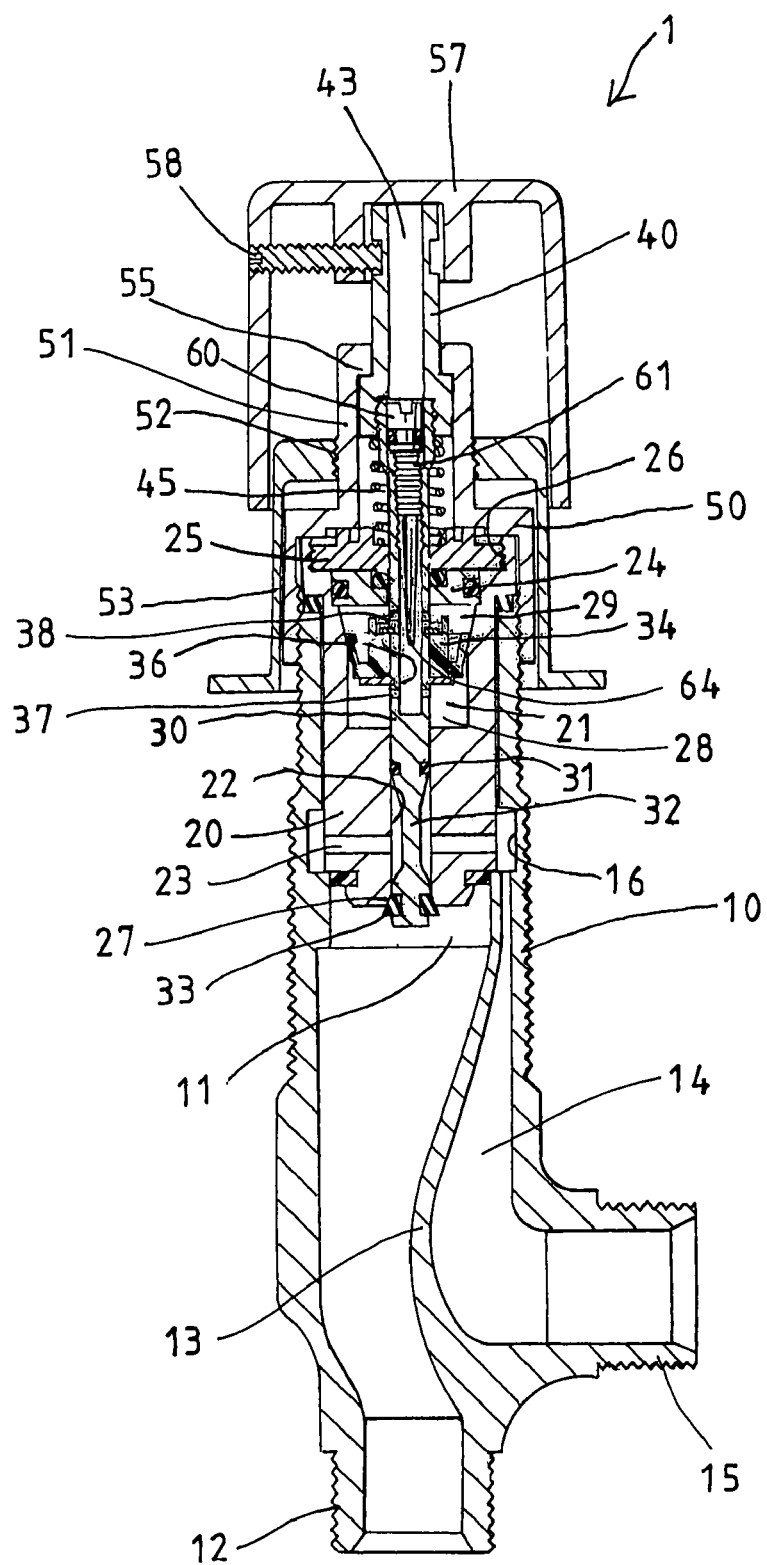
FIG. 4 is a cross sectional view of the water faucet taken along lines 4-4 of FIG. 1.
Figure 5:
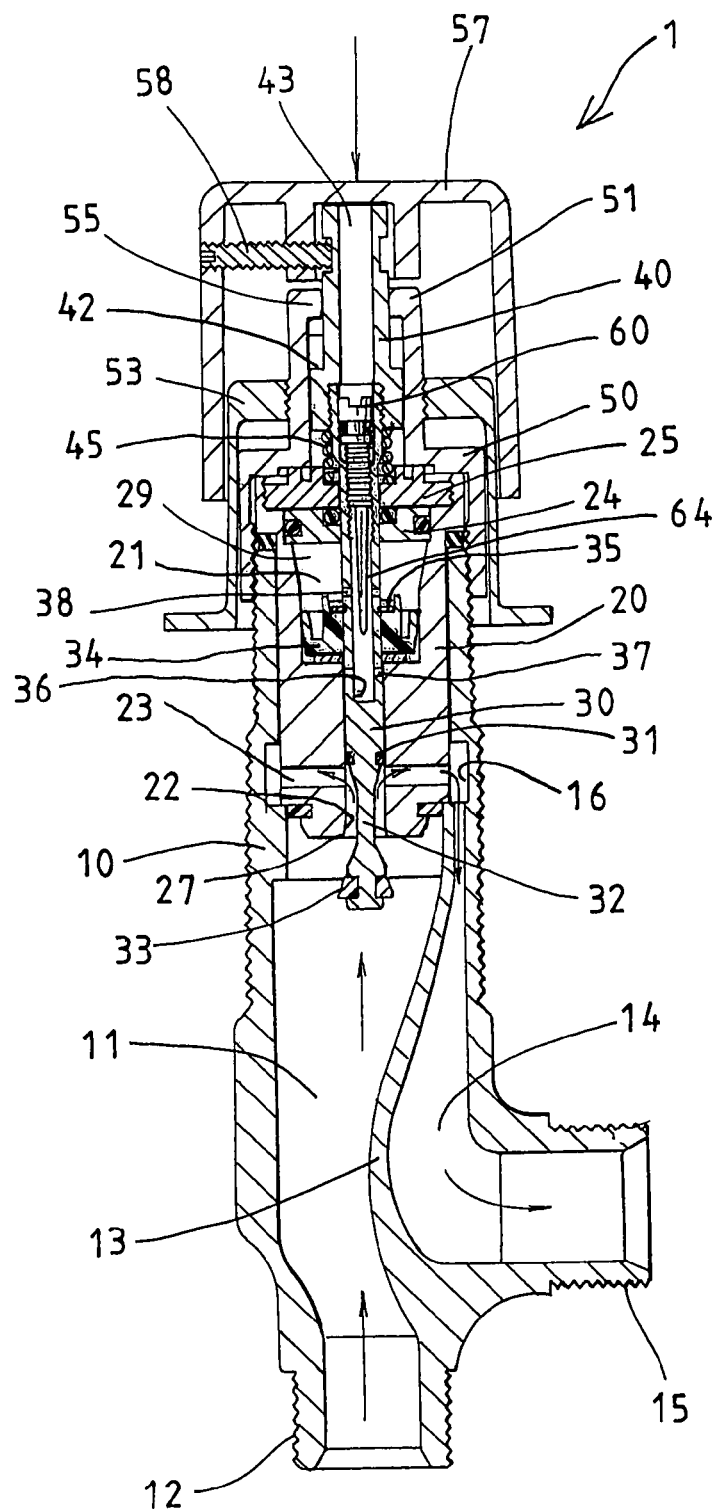
FIG. 5 is a cross sectional view similar to FIG. 4, illustrating the operation of the water faucet.
Figure 6:
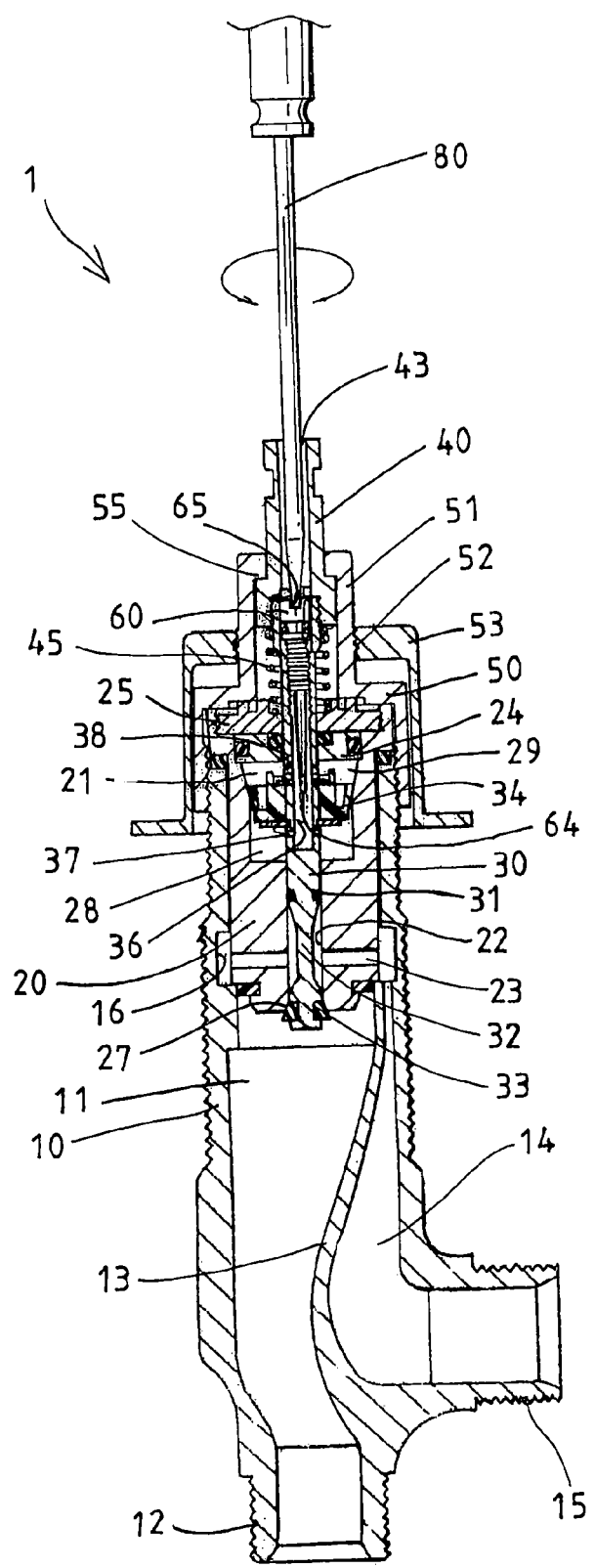
FIG. 6 is a further cross sectional view similar to FIGS. 4 and 5, illustrating the adjustment of the water control device for the water faucet.

Referring to the drawings, and initially to FIGS. 1-4, an automatically shut off water faucet 1 in accordance with the present invention comprises an outer faucet body or housing 10 including a chamber 11 formed therein, and including a water inlet 12 formed in such as the lower portion thereof and communicating with the chamber 11 of the housing 10 for coupling to a water reservoir and for receiving a water therefrom, and including a partition 13 provided or formed in the chamber 11 of the housing 10 for forming a space 14, and including a water outlet 15 communicating with the space 14 for discharging the water, in which the partition 13 may separate the water inlet 12 and the chamber 11 of the housing 10 from the space 14 and the water outlet 15 of the housing 10 (FIGS. 4-6). The above-described structure is typical and will not be described in further details.

A control device 2 includes a receptacle 20 engaged into the chamber 11 of the housing 10, as shown in FIGS. 3-6, the receptacle 20 includes a compartment 21 formed in such as the upper portion thereof, and a passage 22 formed in such as the lower portion thereof and communicating with the compartment 21 thereof and also communicating with the water inlet 12 and the chamber 11 of the housing 10 (FIG. 5), and includes one or more conduits 23 laterally formed in the lower portion thereof and communicating with the passage 22 thereof for communicating with the water outlet 15 of the housing 10, and the housing 10 includes an inner peripheral recess 16 formed therein and communicating with the space 14 and the water outlet 15 of the housing 10, and aligned with the conduits 23 of the receptacle 20 for allowing the water to flow from the passage 22 of the receptacle 20 through the conduits 23 of the receptacle 20 and into the inner peripheral recess 16 and the space 14 and the water outlet 15 of the housing 10 (FIG. 5).

An insert 24 and a cap 25 may be engaged into the upper portion of the receptacle 20 with such as a threading engagement 26 (FIG. 3) for closing the compartment 21 of the receptacle 20 (FIGS. 4-6). A valve stem 30 is slidably engaged through the insert 24 and the cap 25 and slidably engaged through the compartment 21 and the passage 22 of the receptacle 20, and includes a sealing ring 31 attached to the middle or lower portion thereof for sealingly engaging with the receptacle 20, and for separating the compartment 21 and the passage 22 or the conduits 23 of the receptacle 20 from each other, and for preventing the water from flowing from the passage 22 into the compartment 21 of the receptacle 20 (FIG. 5), and includes a diameter reduced neck portion 32 provided or formed in the lower portion thereof for allowing the water to selectively flow from the passage 22 into the conduits 23 of the receptacle 20, also best shown in FIG. 5.

The valve stem 30 further includes a sealing ring or valve portion or member 33 attached to the lower portion thereof for selectively and sealingly engaging with a valve seat 27 of the receptacle 20, and for selectively blocking the passage 22 of the receptacle 20, and for preventing the water from flowing from the water inlet 12 and the chamber 11 of the housing 10 into the passage 22 and the conduits 23 of the receptacle 20 and into the space 14 and the water outlet 15 of the housing 10. Accordingly, in operation, as shown in FIGS. 4 and 6, when the valve member 33 of the valve stem 30 is forced to engage with the valve seat 27 of the receptacle 20, the chamber 11 of the housing 10 may be blocked and the water may not flow from the water inlet 12 and the chamber 11 of the housing 10 into the space 14 and the water outlet 15 of the housing 10 at this moment. The water may flow from the water inlet 12 of the housing 10 into the passage 22 and the conduits 23 of the receptacle 20 and then into the space 14 and the water outlet 15 of the housing 10 when the valve member 33 of the valve stem 30 is disengaged from the valve seat 27 of the receptacle 20 (FIG. 5).

A valve element or piston 34 is attached to the middle portion of the valve stem 30 with one or more retaining rings 35, and slidably engaged in the compartment 21 of the receptacle 20 and sealingly engaged with the receptacle 20, for separating the compartment 21 of the receptacle 20 into a lower space 28 and an upper space 29, and the valve stem 30 includes a blind hole or cavity 36 formed in the upper portion thereof, and includes one or more orifices 37 formed therein for communicating the cavity 36 of the valve stem 30 with the lower space 28 of the compartment 21 of the receptacle 20, and includes one or more apertures 38 formed therein for communicating the cavity 36 of the valve stem 30 with the upper space 29 of the compartment 21 of the receptacle 20 and for allowing a fluid received in the compartment 21 of the receptacle 20 to flow between the lower space 28 and the upper space 29 of the compartment 21 of the receptacle 20 and to flow into and out of the cavity 36 of the valve stem 30 through the orifices 37 and the apertures 38 of the valve stem 30.

Accordingly, in operation, as shown in FIGS. 4-6, when the piston 34 is forced to move relative to the receptacle 20 by the valve stem 30, the fluid received in the compartment 21 of the receptacle 20 may flow from the lower space 28 of the compartment 21 of the receptacle 20 into the cavity 36 of the valve stem 30 and then into the upper space 29 of the compartment 21 of the receptacle 20 when the piston 34 is moved downwardly relative to the receptacle 20, or may flow from the upper space 29 of the receptacle 20 into the cavity 36 of the valve stem 30 and then into the lower space 28 of the receptacle 20 when the piston 34 is moved upwardly relative to the receptacle 20, such that the movement of the piston 34 relative to the receptacle 20 may be provided for damping or slowing the movement of the valve stem 30 relative to the receptacle 20 and for delaying the engagement of the valve member 33 of the valve stem 30 with the valve seat 27 of the receptacle 20.

The valve stem 30 includes an outer thread 39 provided or formed on the upper portion thereof for threading or engaging with a lower portion 41 of a button 40 and for moving in concert with the button 40, and includes an outer peripheral shoulder 42 formed in the outer peripheral portion thereof, and includes a bore 43 formed therein. A cover 50 is threaded or attached or engaged onto the upper portion of the housing 10 and engaged with the upper portion of the receptacle 20 for solidly securing and retaining the receptacle 20 in the chamber 11 of the housing 10, and includes a diameter reduced barrel 51 extended upwardly therefrom, and includes an outer thread 52 provided or formed on the outer portion of the barrel 51 for threading or engaging with an outer shield 53, and includes a pathway 54 formed therein for slidably receiving the button 40 and for allowing the button 40 to be slidably extended out of the barrel 51 of the cover 50.

The cover 50 further includes a peripheral flange 55 extended inwardly into the pathway 54 thereof for engaging with the outer peripheral shoulder 42 of the button 40, and for limiting the button 40 to slide or to move relative to the housing 10 and the cover 50, and a knob 57 slidably attached or engaged onto the upper or outer portion of the shield 53 and secured to the button 40 with one or more fasteners 58 for allowing the button 40 and the valve stem 30 to be depressed or caused to move relative to the housing 10 and the cover 50, and a spring biasing means or spring member 45 is engaged onto the outer portion of the valve stem 30 and engaged between the lower portion 41 of the button 40 and the cap 25 of the receptacle 20 for biasing or forcing the button 40 and the valve stem 30 to move upwardly relative to the housing 10 and the cover 50, and for actuating the valve member 33 of the valve stem 30 to engage with the valve seat 27 of the receptacle 20 and thus for blocking the chamber 11 of the housing 10.

A needle valve or valve element 60 is movably engaged into the cavity 36 of the valve stem 30 and engaged with the valve stem 30 with such as a threading engagement 61 for allowing the valve element 60 to be moved or adjusted up and down relative to the valve stem 30, and includes an outer peripheral groove 62 formed in the outer peripheral portion thereof for engaging with a sealing ring 63 and for sealingly engaging with the valve stem 30, and includes a probe or rod 64 extended or engaged into the cavity 36 of the valve stem 30 and movable or adjustable relative to the orifices 37 and the apertures 38 and the cavity 36 of the valve stem 30 for adjusting the flowing of the fluid between the lower space 28 and the upper space 29 of the compartment 21 of the receptacle 20 and thus for adjusting the engaging time of the valve member 33 of the valve stem 30 with the valve seat 27 of the receptacle 20, in order to adjust the flowing quantity or the flowing time of the outlet flowing water through the water outlet 15 of the housing 10.

The valve element 60 includes an engaging slot 65 formed or provided in the upper portion thereof for engaging with a driving tool device 80 which may be extended or engaged into the bore 43 of the button 40 (FIG. 6) when the knob 57 is disengaged or removed from the cover 50, for rotating or adjusting or moving the valve element 60 relative to the valve stem 30 and thus for moving or adjusting the rod 64 of the valve element 60 relative to the orifices 37 and the apertures 38 and the cavity 36 of the valve stem 30 in order to adjust the flowing of the fluid between the lower space 28 and the upper space 29 of the compartment 21 of the receptacle 20.

Accordingly, the automatically shut off water faucet in accordance with the present invention includes a simplified structure for controlling the flowing quantity or the flowing time of the outlet flowing water through the water faucet.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water faucet comprising:

a housing including a chamber formed therein, and including a water inlet communicating with said chamber of said housing for receiving a water, and including a water outlet for discharging the water, a receptacle engaged into said chamber of said housing and including a compartment formed in an upper portion, and a passage formed in a lower portion and communicating with said compartment and said water inlet of said housing, and including at least one conduit formed in said receptacle and communicating with said passage for communicating said passage with said water outlet of said housing, and including a valve seat, a valve stem slidably engaged through said compartment and said passage of said receptacle and sealingly engaged with said receptacle for separating said compartment and said passage of said receptacle from each other and for preventing the water from flowing from said passage into said compartment of said receptacle, said valve stem including a valve member for selectively and sealingly engaging with said valve seat of said receptacle and for selectively blocking said passage of said receptacle and for preventing the water from flowing from said water inlet of said housing into said passage and said at least one conduit of said receptacle and into said water outlet of said housing, and said valve stem including a cavity formed therein, means for biasing said valve member of said valve stem to engage with said valve seat of said receptacle, and a piston attached to said valve stem and slidably engaged in said compartment of said receptacle and sealingly engaged with said receptacle for separating said compartment of said receptacle into a lower space and an upper space, and said valve stem including at least one orifice for communicating said cavity of said valve stem with said lower space of said receptacle, and including at least one aperture for communicating said cavity of said valve stem with said upper space of said receptacle and for allowing a fluid received in said compartment of said receptacle to flow between said lower space and said upper space of said receptacle and to flow into and out of said cavity of said valve stem through said at least one orifice and said at least one aperture of said valve stem, the water being allowed to flow from said water inlet of said housing into said passage and said at least one conduit of said receptacle and into said water outlet of said housing when said valve member of said valve stem is disengaged from said valve seat of said receptacle, and when said valve stem is moved against said biasing means.

2. The water faucet as claimed in claim 1, wherein said housing includes a partition provided in said chamber of said housing for forming a space, and for separating said water inlet of said housing from said space and said water outlet of said housing.

3. The water faucet as claimed in claim 2, wherein said housing includes an inner peripheral recess formed therein and communicating with said space and said water outlet of said housing, and aligned with said at least one conduit of said receptacle for allowing the water to flow from said passage of said receptacle through said at least one conduit of said receptacle and into said inner peripheral recess and said space and said water outlet of said housing.

4. The water faucet as claimed in claim 1, wherein said valve stem includes a diameter reduced neck portion provided therein and arranged for allowing the water to selectively flow from said passage into said at least one conduit of said receptacle.

5. The water faucet as claimed in claim 1, wherein a cap is engaged onto said receptacle for closing said compartment of said receptacle, and said valve stem is slidably engaged through said cap.

6. The water faucet as claimed in claim 1, wherein a button is attached to said valve stem and moved in concert with said valve stem, and said biasing means includes a spring member engaged between said button and said receptacle for biasing said button and said valve stem to move relative to said housing and for actuating said valve member of said valve stem to engage with said valve seat of said receptacle.

7. The water faucet as claimed in claim 6, wherein a cover is attached onto said housing and engaged with said receptacle for retaining said receptacle in said chamber 11 of said housing, and includes a barrel extended upwardly from said cover, and includes a pathway formed therein for slidably receiving said button and for allowing said button to be slidably extended out of said barrel of said cover.

8. The water faucet as claimed in claim 7, wherein a knob is secured to said button with at least one fastener.

9. The water faucet as claimed in claim 1, wherein a valve element is movably engaged into said cavity of said valve stem and includes a rod extended into said cavity of said valve stem for determining a flowing of the fluid between said lower space and said upper space of said receptacle.

10. The water faucet as claimed in claim 9, wherein said valve element is engaged with said valve stem with a threading engagement for allowing said rod of said valve element to be moved and adjusted relative to said at least one orifice and said at least one aperture of said valve stem and for adjusting the flowing of the fluid between said lower space and said upper space of said receptacle.

11. The water faucet as claimed in claim 10, wherein said valve element includes an engaging slot formed therein for engaging with a driving tool device and for adjusting said valve element relative to said valve stem and for adjusting said rod of said valve element relative to said at least one orifice and said at least one aperture of said valve stem.

12. The water faucet as claimed in claim 1, wherein a sealing ring is attached to said valve stem and sealingly engaged with said receptacle for separating said compartment and said passage of said receptacle from each other.

* * * * *